March 16, 1965     G. REUSCH     3,173,170

APPLICATOR FOR SEALING MATERIAL

Filed June 26, 1962     2 Sheets-Sheet 1

Inventor:
Gotthilf Reusch
By McGlew and Toren
Attorneys

March 16, 1965  G. REUSCH  3,173,170
APPLICATOR FOR SEALING MATERIAL
Filed June 26, 1962  2 Sheets-Sheet 2

Inventor:
Gotthilf Reusch
By McGlew and Toren
Attorneys

United States Patent Office

3,173,170
Patented Mar. 16, 1965

3,173,170
APPLICATOR FOR SEALING MATERIAL
Gotthilf Reusch, Esslingen, Germany, assignor to
J. Eberspacher, Esslingen (Neckar), Germany, a
German firm
Filed June 26, 1962, Ser. No. 205,451
11 Claims. (Cl. 18—3.5)

This application is a continuation-in-part of application, Serial No. 173,396, filed February 15, 1962, and now abandoned.

This invention relates in general to devices for applying sealing material and in particular to a new and useful applicator for calking, putty, grout and similar material having a discharge formed as a narrow elongated slot and including guide means associated with the slot for orienting the latter during the operation of the device.

The present invention is particularly applicable to devices which include a nozzle for the discharge of a sealing material such as putty, grout or calking substance for sealing window panes and associated window frames.

Prior to the present invention, devices of this character were suitable only for sealing large-sized (side) openings or slots at the connection of the window frame to the building structure or the connection of the window pane to the window frame. It was found that devices of this character were not suitable, for example, for sealing the rim of a multiple pane window construction or for sealing the space between window panes of such construction.

In accordance with the present invention, there is provided a device for dispensing sealing material which includes a nozzle having an elongated slot discharge and guiding means adjacent the nozzle for orienting the slot discharge with respect to the article requiring sealing. In a preferred arrangement, the guiding means includes a formation on the front of the nozzle casing which is made of elastic material with the slot discharge recessed between the sides thereof. The elastic material is preferably made of a material such as foam rubber, plastic and the like which permits the forward end of the device to be pressed against the construction requiring sealing in order to orient the nozzle discharge in relation thereto.

In a preferred arrangement, the device includes guide tongues or projections which provide means for orienting the end of the nozzle to insure that the material directed outwardly therefrom enters the precise location at which sealing is desired. The tongues, which extend outwardly, may be positioned, for example, between panes of a multiple window pane construction to achieve the desired orientation of the slot discharge in relation to the space between the panes. Such tongues are advantageously made of metal or synthetic material and the effective thickness of the tongues and the lateral spacing thereof is advantageously adjustable. The tongues are usually made of a thickness somewhat smaller than the distance between the usual arrangement of panes when the device is to be used for sealing between panes of a multiple pane window construction in order to permit insertion of the tongues between the panes for orienting each end of the nozzle in respect thereto. In some instances, it is desirable that the thickness of the tongues be varied to permit clamping of the device in relationship to the window construction. In some other instances, it is preferable to form the tongues of elastic material to permit bending and formation thereof in accordance with the unevenness or curvature of the individual glass panes to insure that the device may be manipulated along the edge of such panes.

Accordingly, it is an object of this invention to provide an improved device for dispensing sealing material.

A further object of the invention is to provide a calking device which includes a nozzle discharge formed as an elongated slot, and guide means for orienting the slot in relation to an article to be sealed.

A further object of the invention is to provide a calking gun which includes a housing having a nozzle discharge with the forward portion thereof surrounding the nozzle made of an elastic material and further including guide tongues extending outwardly on each side of the nozzle for orienting the latter for the dispensing of a sealing material.

A further object of the invention is to provide a sealing material dispensing device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
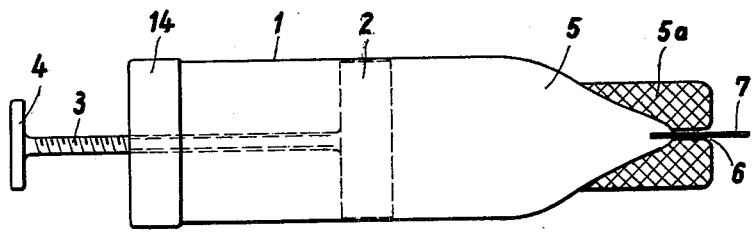
FIG. 1 is a side elevation of a calking gun constructed in accordance with the invention.

Referring to the drawings in particular, the invention embodied therein includes a calking gun generally designated 1, which includes an elongated cylindrical housing 5 in which is reciprocable a piston 2 having a rod portion 3 which terminates in an exterior handle 4. The rod portion 3 extends through a cylindrical cap 12 closing the end of the casing 5.

In accordance with the invention the forward or nozzle end of the casing 5 includes a laterally elongated discharge slot 6 which is surrounded by an elastic material 5a. At each outer end of the nozzle slot 6 there is provided guide means such as tongues 7 which are advantageously laterally adjustable and are of varying thickness.

Figure 2:
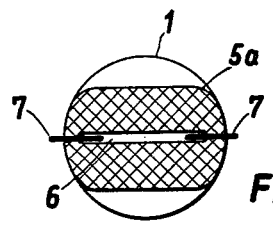
FIG. 2 is a front nozzle-end elevation of the calking gun indicated in FIG. 1.
Figure 3:
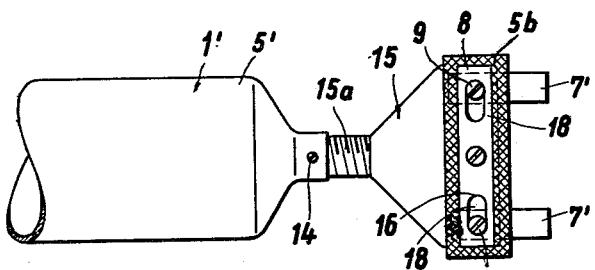
FIG. 3 is a fragmentary plan of another embodiment of the invention.

In the embodiment indicated in FIG. 3, a gun 1' is provided with a removable nozzle assembly generally designated 15 which includes a narrow neck portion 15a which is secured to a housing portion 5' by means of a securing screw 14. In this embodiment, the nozzle portion 15 may be employed with an ordinary calking gun as a separate attachment therefor. Disposed in the nozzle discharge opening, which discharge opening is elongated similarly to the discharge 6 in FIGS. 1 and 2, there is a cross-plate 16 having laterally elongated slots 18 which accommodate a securing bolt 9 which holds a set of tongues 7', 7' permitting the lateral adjustable movement thereof. The tongues 7', 7' are advantageously made of varying thicknesses and may be interchanged to facilitate the use of the device with multiple window panes of varying spacings between panes. In some instances, tongues 7' are made adjustable in respect to thickness by applying more than one tongue which are held on the cross-plate 8 by each securing bolt 9.

Figure 4:
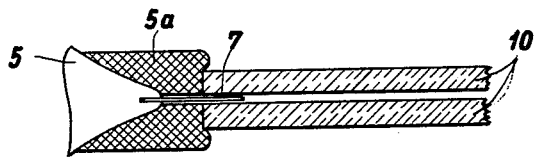
FIG. 4 is a sectional view of a multiple pane window construction indicating the gun of FIG. 1 in a position for applying sealing material between the panes.

As indicated in FIG. 4, the resilient material 5a is of a characteristic that permits it to be deformed inwardly against an edge formed between spaced window panes 10 of a window pane construction. In this position the tongue 7 is inserted between the panes and permits orientation of the discharge slot for the injection of the sealing material between the panes 10. By providing the elastic material 5a, the front portion of the nozzle will absorb any unevenness on the edge of the pane rims. The elastic material also insures that the sealing compound will not be directed onto the edge of the window panes but will be confined by the elastic material to enter into the space between panes. In some instances, the tongues are made of a thickness to insure lateral limitation of the spread of the sealing material. In such instances, they are made sufficiently wide so that the material cannot be directed outwardly beyond the positioning of the tongues 7', as indicated in FIG. 3.

In the embodiment of FIG. 1, the pressure casing 5 is manually subjected to pressure by moving the piston 2 by means of the handle 4. Of course, any further arrangement including an automatic pressurizing system may be used. The nozzle discharge 6 includes an interior valve (not shown) which may be manually operated to open and shut this discharge.

In the embodiment of FIG. 3, the nozzle 15 is formed with synthetic material strips 5b which are arranged on both sides of the nozzle casing.

The device may be employed with automatically operating means for orienting the device in respect to the structure to be sealed and may include means for controlling the inward pressure and the orientation of the device as set by the guide means 7. The automatic control may be constructed, for example, in a manner whereupon after the engagement of the front of the nozzle portion with the window pane construction means will be provided to move the structure along the pane and the valve within the housing 5 may be automatically operated. In some instances, the housing is constructed so that the slot width 6 is made adjustable.

Figure 5:
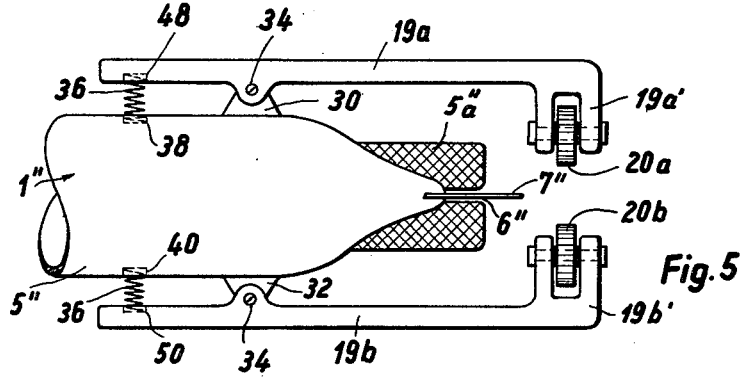
FIG. 5 is a partial side elevation of another embodiment of calking gun.

In the embodiment indicated in FIG. 5 there is shown a calking gun generally designated 1" which comprises a cylindrical barrel portion 5" as in the other embodiments which includes a forward converging wall section terminating in a nozzle discharge for the calking material. The nozzle includes a laterally elongated discharge slot 6" at each end of which there is provided a tongue member 7" arranged for alignment purposes. The slot 6" is also surrounded by the laterally elongated elastic material 5a' as in the embodiment indicated in FIGS. 1 and 4. In accordance with the embodiment of FIG. 5, there are provided brackets 30 and 32 which extend outwardly from each side of the barrel 5" and support distance holding levers 19a and 19b at pivot locations 34 on the brackets 30 and 32, respectively. Diametrically opposite compression springs 36, 36 have one of their ends confined in slots 38 and 40 defined at opposite sides of the barrel 5" and their opposite ends are fitted into recesses 48 and 50 on respective holding levers 19a and 19b.

The opposite ends of the levers 19a and 19b carry inwardly turned arms 19a' and 19b' which rotatably support rollers 20a and 20b, respectively. The rollers are adapted to bear on opposite surfaces of panels or panes fitted therebetween and ride on the panes with outward movements of the opposed arms 19a' and 19b' being resisted by the compression springs 36, 36. The distance holding levers 19a and 19b thus function to align the nozzle opening 6" with the tongue 7" for insertion of the calking material between panes and also to insure that the panes which are to receive calking material therebetween are not directed away from each other when the calking material is inserted therebetween.

Figure 6:
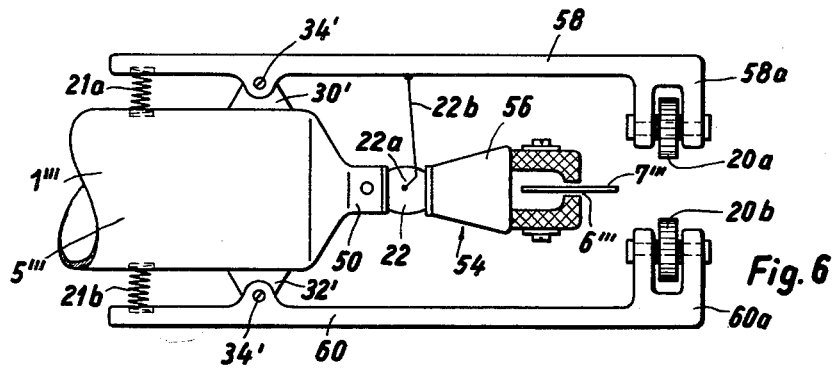
FIG. 6 is a partial elevation of still another embodiment of calking gun.

In the embodiment indicated in FIG. 6, there is shown a nozzle generally designated 1''' which includes a barrel portion 5''' and which carries a reduced forward section 52 which is adapted to receive a nozzle valve assembly generally designated 54. The valve assembly 54 includes an adjustable valve 22 with a flaring discharge portion 56 which terminates in a laterally elongated slot discharge 6'''. Tongues 7'''' are arranged for guiding purposes as in the other embodiments. In this embodiment, brackets 30' and 32' pivotally support distance holding levers 58 and 60 at pivot locations 34' and they include in-turned opposed ends 58a and 60a, respectively, which carry rollers 20a and 20b adapted to ride on opposite faces of a pair of panels which are to receive the calking therebetween. The ends 58a and 60a are directed outwardly in opposite directions when the calking material is inserted between the panes to cause them to move apart. The springs 21a and 21b which act on the opposite ends of the arms 58 and 60 prevent the panes from being spread apart beyond a predetermined amount during the insertion of the calking material.

A further feature of the embodiment indicated in FIG. 6 is that the valve 22 is operated by the pivotal movement of the distance holding levers 58 and 60 acting through levers 22b and 22a. The valve 22 is advantageously arranged to operate to close down the valve opening and hence the quantity of calking material supplied when the panes have moved outward beyond a predetermined amount to cause the arms 58 and 60 to rock in a direction away from each other.

Figure 7:
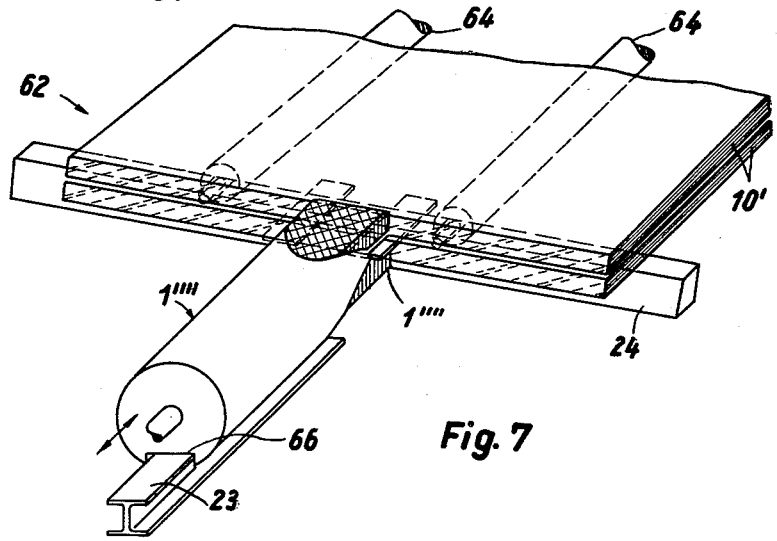
FIG. 7 is a perspective view of an automatic calking gun mounting arrangement for aligning the gun for operation on glass paneling which is fitted in a direction transverse thereto.

In FIG. 7 another embodiment of the invention is indicated which includes means for insuring the feeding of panes into alignment with the operation of a calking gun for the progressive movement of the calking gun along the length of the pane by relative movement between the two elements. As indicated in the drawings, a work station generally designated 62 is provided which includes laterally opposed supporting beams or base elements 24, 24 (only one of which is indicated). The supporting base elements carry rollers 64 upon which two panes, or elements requiring calking, such as glass panels 10', are fed either manually or automatically. In this embodiment, a centering rail or track 23 is provided at right angles to the base or support 24 and a nozzle member generally designated 1'''' is provided which includes a slot 66 at the bottom end which is adapted to glide over the track 23 toward and away from the support 24. During operation, the nozzle member or gun 1'''' is moved to engage tongues 7'''' between the glass panels 10' adjacent one end thereof. Then the glass panels 10' are automatically moved in a direction to cause traverse of the panels along their entire length by the calking device 1''''.

While specific embodiments of the invention have been shown and described in detail to illustrate the application of the inventive principles, it will be understood that the invention may be embodied otherwise without departing from such principles.

What is claimed is:

1. A nozzle construction for a sealing material dispenser and the like comprising a hollow casing having a discharge opening formed as an elongated slot, elastic material surrounding said slot and extending forwardly, therefrom to facilitate orienting of the end of the nozzle in respect to an article requiring sealing, a plate secured adjacent said slot, and a pair of laterally spaced tongues mounted on said plate and extending outwardly for fitting into a space to receive the sealing material.

2. A device for inserting sealing material and the like between two panel elements, comprising a hollow casing having a discharge opening formed as an elongated slot, tongue means adjacent said slot for centering said slot for the discharge of material, and distance holding lever means extending outwardly from said casing on each side of said slot including portions adapted to ride on opposite surfaces of the panel elements receiving the material to limit the outward movement of such elements.

3. A nozzle construction according to claim 2, including valve means connected to said distance holding levers for varying the discharge through said discharge opening.

4. A device for inserting sealing material between panels along their edges, comprising a nozzle member having an elongated discharge opening for the sealing material, a tongue element extending outwardly from said nozzle adapted to be inserted between the panels for aligning the nozzle opening in relation thereto, and distance holding lever means on said nozzle including members adapted to ride on opposite exterior surfaces of said panels and to limit the separation thereof when the sealing material is inserted therebetween.

5. A device according to claim 4, wherein said distance holding lever means includes a lever arm pivotally mounted on diametrically opposite sides of said nozzle and the elongated slot thereof, said lever arms having in-turned ends with roller means thereon adapted to ride against opposite exterior surfaces of the panels receiving the sealing material.

6. A device for sealing panels such as glass along the edge thereof, comprising roller means for feeding said panels along a given direction, a track extending at substantially right angle to said roller means, a nozzle member mounted for movement along said track including a nozzle discharge elongated in the direction of said roller means, and tongue positioning means on said nozzle member adjacent said nozzle discharge for locating said nozzle between panels fed on said roller means.

7. A sealing material dispensing device particularly applicable for inserting a sealing material between window panes of a multiple pane window construction, comprising a housing having a nozzle with an elongated slot discharge, and guide means extending outwardly in front of said housing for orienting the discharge opening in relation to the construction requiring sealing, said guide means comprising elastic material formed around at least a portion of the slot discharge and a tongue extending outwardly from said housing adjacent each end of said slot.

8. A sealing material dispensing device particularly applicable for inserting a sealing material between window panes of a multiple pane window construction, comprising a housing having a nozzle with an elongated slot discharge, and guide means extending outwardly in front of said housing for orienting the discharge opening in relation to the construction requiring sealing, said guide means comprising elastic material formed around at least a portion of the slot discharge, and a tongue extending outwardly from said housing adjacent each end of said slot, at least one of said tongues being laterally adjustable.

9. A sealing material dispensing device particularly applicable for inserting a sealing material into a narrow gap such as between window panes of a multiple pane window construction, comprising a housing having a nozzle with an elongated slot discharge, and guide means extending outwardly in front of said housing for orienting the discharge opening in relation to the narrow gap into which the sealing material is to be directed, said guide means comprising elastic material formed around at least a portion of the slot discharge, and a fixed tongue extending outwardly from the end of said nozzle in alignment with said slot and engageable in the gap to be filled for orienting said slot in respect thereto.

10. A sealing material dispensing device particularly applicable for inserting a sealing material into a sealing gap between articles such as window panes of a multiple pane window construction, comprising a housing having a nozzle with an elongated slot discharge, and guide means extending outwardly in front of said housing for orienting the discharge opening in relation to the construction requiring sealing, said guide means comprising elastic material extending entirely around said slot discharge, and a fixed flat tongue extending outwardly from said nozzle in alignment with the slot for orienting the slot in alignment with the sealing gap to be filled with sealing material.

11. A sealing material dispensing device particularly applicable for inserting a sealing material into a sealing gap between articles such as window panes of a multiple pane window construction, comprising a housing having a nozzle with an elongated slot discharge, and guide means extending outwardly in front of said housing for orienting the discharge opening in relation to the construction requiring sealing, said guide means comprising elastic material formed around at least a portion of the slot discharge, and a fixed flat tongue extending outwardly from said housing adjacent said slot and being in alignment with said slot for locating said slot in respect to the sealing gap into which the sealing material will be discharged.

References Cited by the Examiner

UNITED STATES PATENTS

| | | | |
|---|---|---|---|
| 760,027 | 5/04 | Shelley | 18—3.5 |
| 1,841,180 | 1/32 | Harding | 18—3.5 |
| 2,346,879 | 4/44 | Turzillo | 118—410 XR |
| 2,636,214 | 4/53 | Slusher | 18—3.5 |
| 2,661,496 | 12/53 | Lubenow | 141—135 XR |

FOREIGN PATENTS 388,273  2/33  Great Britain.

WILLIAM J. STEPHENSON, *Primary Examiner.*

MICHAEL V. BRINDISI, *Examiner.*